(12) United States Patent
Yasugi (10) Patent No.: US 8,299,650 B2
(45) Date of Patent: Oct. 30, 2012

(54) WIND TURBINE GENERATOR AND OUTPUT POWER CONTROL METHOD

(75) Inventor: Akira Yasugi, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 12/966,576

(22) Filed: Dec. 13, 2010

(65) Prior Publication Data

US 2012/0049517 A1 Mar. 1, 2012

Related U.S. Application Data

(63) Continuation of application No. PCT/JP2010/064470, filed on Aug. 26, 2010.

(51) Int. Cl.
*H02J 3/00* (2006.01)
(52) U.S. Cl. ........................................ 307/103
(58) Field of Classification Search .............. 307/103
See application file for complete search history.

(56) References Cited

U.S. PATENT DOCUMENTS

| | | | |
|---|---|---|---|
| 7,227,275 B2 * | 6/2007 | Hennessy et al. | 290/55 |
| 7,345,373 B2 | 3/2008 | Delmerico et al. | |
| 7,456,510 B2 | 11/2008 | Ito et al. | |
| 7,528,496 B2 | 5/2009 | Fortmann | |
| 7,680,562 B2 | 3/2010 | Delmerico et al. | |
| 7,761,190 B2 | 7/2010 | Delmerico et al. | |
| 7,982,325 B2 * | 7/2011 | Andersen | 290/44 |
| 2009/0167021 A1 | 7/2009 | Andersen | |

FOREIGN PATENT DOCUMENTS

| | | |
|---|---|---|
| JP | 2000-166096 | 6/2000 |
| JP | 2003-333752 | 11/2003 |
| JP | 2009-197587 | 9/2009 |
| JP | 2009-303355 | 12/2009 |
| WO | 2004-047284 | 6/2004 |

OTHER PUBLICATIONS

ISR for PCT/JP2010/064470 dated Nov. 16, 2010.
Solutions for Wind Power Performance by GE Energy (http://www.gepower.com/businesses/ge_wind_energy/en/downloads/GEA14595B.pdf), 2009.

* cited by examiner

*Primary Examiner* — Hal Kaplan
(74) *Attorney, Agent, or Firm* — Kanesaka Berner and Partners LLP

(57) ABSTRACT

A wind turbine generator derives the gradient of a change in output power of a generator that generates power by rotation of a wind turbine rotor, and determines an increase/decrease in the output power of the generator on the basis of the derived gradient of the change in output power. Then, when the frequency of a utility grid has dropped, power control is performed on the basis of the determination results. Therefore, a decrease in the amount of power supplied to the utility grid can be more effectively compensated for by accurately detecting output power fluctuations of the generator, using a simple configuration.

5 Claims, 12 Drawing Sheets

WIND TURBINE GENERATOR AND OUTPUT POWER CONTROL METHOD

RELATED APPLICATIONS

The present application is a continuation of, and claims priority from, International Application Number PCT/JP2010/064470, filed Aug. 26, 2010, the disclosure of which is hereby incorporated by reference herein in its entirety.

CROSS REFERENCE TO RELATED APPLICATIONS

This is a continuation of International Application PCT/JP2010/064470, with an international filing date of Aug. 26, 2010, which is hereby incorporated by reference herein in its entirety.

TECHNICAL FIELD

The present invention relates to a wind turbine generator and an output power control method.

BACKGROUND ART

With a wind turbine generator that receives energy of wind power with blades to rotate a wind turbine rotor and generates power by driving a generator with the rotation of the wind turbine rotor, there has been a problem in that the output power thereof fluctuates due to fluctuations in wind speed.

As a technology for solving this problem, Patent Literature 1 discloses a wind turbine generator, wherein power of variable frequency generated by a generator, which is connected to a wind turbine shaft, is converted with a rectifier to direct-current power; the direct-current power is converted with an inverter to alternating-current power; a secondary battery that can be charged/discharged is connected in series between the rectifier and the inverter; and the secondary battery is subjected to constant charge/discharge control so as to alleviate fluctuations in the output power to a utility grid. In more detail, the wind turbine generator disclosed in Patent Literature 1 alleviates fluctuations in the output power to the utility grid by using an output value from a high-frequency cut filter, which removes an amount corresponding to the fluctuations from detected value of the output power of the generator, as an output value of the inverter and by absorbing a difference between the generator output power and the inverter output power via charging/discharging of the above-described secondary battery.

CITATION LIST

Patent Literature

{PTL 1} Japanese Unexamined Patent Application, Publication No. 2003-333752.

SUMMARY OF INVENTION

Technical Problem

However, with the technology disclosed in Patent Literature 1, the difference between the generator output power and the output value of the high-frequency cut filter is set as the power to be absorbed through charging/discharging of the secondary battery, and thus a configuration for detecting fluctuation levels of the power output from the generator is complicated.

The present invention has been conceived in light of the above-described situation, and an object thereof is to provide a wind turbine generator that is capable of more effectively compensating for a reduction in the amount of power supplied to a utility grid by accurately detecting generator output power fluctuations using a simple configuration, as well as an output power control method therefor.

Solution to Problem

In order to solve the above-described problems, the present invention employs the following solutions.

A wind turbine generator according to a first aspect of the present invention is a wind turbine generator which rotates a wind turbine rotor having a plurality of blades by receiving wind thereon, drives a generator with the rotation of the wind turbine rotor, and supplies power generated by the generator to a utility grid, including a determination unit for deriving the gradient of a change in output power of the generator and for determining an increase/decrease in the output power of the generator on the basis of the derived gradient; and a control unit for performing power control when the frequency of the utility grid has dropped, on the basis of a determination result of the determination unit.

According to the present invention, the determination unit derives the gradient of the change in output power of the generator, which generates power by the rotation of the wind turbine rotor, and determines the increase/decrease in the generator output power on the basis of the derived gradient.

For example, the generator output power is detected a plurality of times at predetermined time intervals, and the gradient of the change in output power is derived from the gradient of a straight line connecting the detected values. For example, the determination unit determines that the generator output power is increasing when the gradient of the change is $0° < \theta < 90°$, and it determines that the generator output power is decreasing when $270° < \theta < 360°$. The case in which the output power is increasing is when the wind speed is rising, and the case in which the output power is decreasing is when the wind speed is declining.

Then, when the utility grid frequency has dropped, the control unit performs power control on the basis of the determination results obtained by the determination unit.

Based on the above, the present invention can more effectively compensate for a decrease in the amount of power supplied to a utility grid by accurately detecting generator output power fluctuations, using a simple configuration.

In addition, the wind turbine generator of the present invention may additionally include a secondary battery that can be charged/discharged, wherein, when the frequency of the utility grid has dropped and the determination unit has determined that the output power of the generator is reduced, the control unit may perform control so as to compensate for the difference between the output power of the generator and the power required by the utility grid with at least one of inertial force accumulated in the wind turbine rotor and power charged in the secondary battery.

When an abnormality (for example, disconnection of a large power plant) occurs in the utility grid, the utility grid frequency temporarily drops considerably. Then, this frequency drop gradually returns to equilibrium state while repeating frequency fluctuations. Consequently, in order to compensate for the frequency drop of the utility grid, that is, a decrease in the amount of power supplied to the utility grid, a requirement arises to alter the output power from interconnected power plants in accordance with the frequency fluctuations in the utility grid. The above-described requirement corresponds to the power required by the utility grid.

Therefore, according to the present invention, when the utility grid frequency has dropped and the determination unit determines that the generator output power is reduced, the control unit performs control so that the difference between the generator output power and the power required by the utility grid is compensated for by at least one of the inertial force accumulated in the wind turbine rotor and the power charged in the secondary battery.

Therefore, even when the amount of power supplied to the utility grid is decreased and the wind speed is also declining, the present invention can supply the output power required by the utility grid.

Furthermore, the wind turbine generator of the present invention may additionally include a secondary battery that can be charged/discharged, and a storing unit for storing, when the frequency of the utility grid has dropped and the determination unit has determined that the output power of the generator is increased, output level of the generator for the case in which the frequency of the utility grid has dropped; wherein the control unit may perform control so that the output power of the generator matches the output level stored in the storing unit, and may perform control so that the difference between the output power of the generator and the power required by the utility grid is compensated for with inertial force accumulated in the wind turbine rotor and power charged in the secondary battery.

If the generator output power is increased when the utility grid frequency has dropped, the generator may output power that exceeds the power required by the utility grid.

Therefore, according to the present invention, the storing unit stores the generator output level for the case in which the utility grid frequency has dropped, and the control unit limits the generator output power so as to match the output level stored in the storing unit.

In addition, the control unit performs control so that the difference between the generator output power and the power required by the utility grid is compensated for by the inertial force accumulated in the wind turbine rotor and the power charged in the secondary battery.

Therefore, even when the amount of power supplied to the utility grid is decreased and the wind speed is rising, the present invention can supply the output power required by the utility grid.

In addition, with the wind turbine generator of the present invention, the control unit may control pitch angles of the blades so that the output power of the generator matches the output level stored in the storing unit.

According to the present invention, the pitch angles of the blades are controlled by the control unit so that the generator output power matches the output level stored in the storing unit.

Therefore, the present invention can readily reduce the generator output power.

In addition, in the wind turbine generator of the present invention, a plurality of the secondary batteries may be provided, and the control unit may perform control so that the power generated by the generator is charged only in those secondary batteries among the plurality of the secondary batteries that do not contribute to discharging, so as to match the output power of the generator with the output level stored in the storing unit.

According to the present invention, the control unit charges secondary batteries that do not contribute to discharging with the power generated by the generator so that the generator output power matches the output level stored in the storing unit.

Therefore, the present invention can readily reduce the generator output power.

On the other hand, a second aspect of the present invention is an output power control method for a wind turbine generator which rotates a wind turbine rotor having a plurality of blades by receiving wind thereon, drives a generator with the rotation of the wind turbine rotor, and supplies power generated by the generator to a utility grid, the output power control method including a first step of deriving the gradient of a change in output power of the generator and determining an increase/decrease in the output power of the generator on the basis of the derived gradient; and a second step of performing power control on the basis of a determination result of the first step, when the frequency of the utility grid has dropped.

According to the present invention, the gradient of the change in generator output power is derived, an increase/decrease in the generator output power is determined on the basis of the derived gradient of the change, and, when the utility grid frequency has dropped, power control is also performed on the basis of the determination results.

Therefore, the present invention can more effectively compensate for a decrease in the amount of power supplied to the utility grid by accurately detecting generator output power fluctuations using a simple configuration.

Advantageous Effects of Invention

The present invention affords an excellent advantage in that a reduction in the amount of power supplied to a utility grid can be more effectively compensated for by accurately detecting generator output power fluctuations using a simple configuration.

DESCRIPTION OF EMBODIMENTS

An embodiment of a wind turbine generator according to the present invention will be described below with reference to the drawings.

Figure 1:
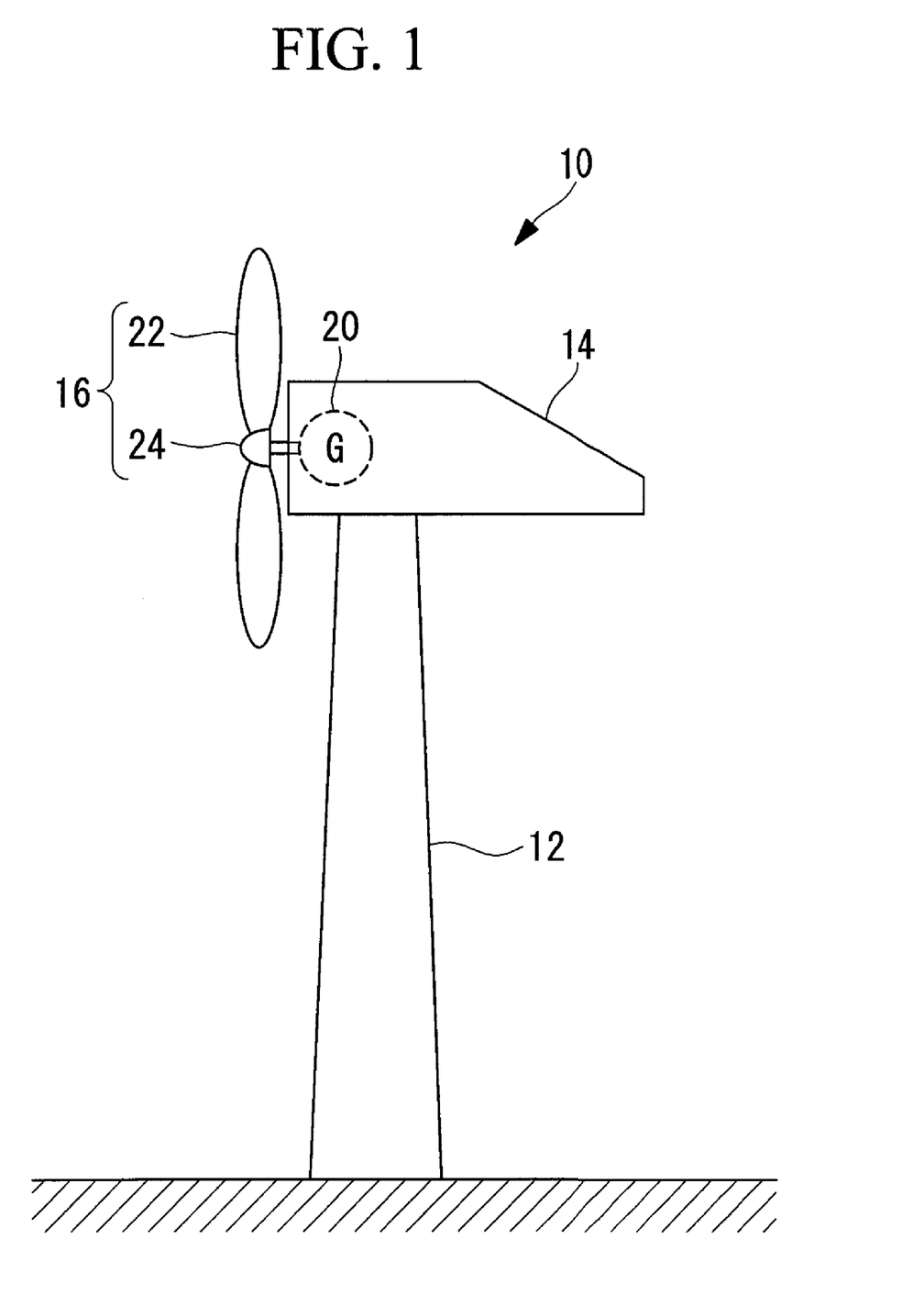
FIG. 1 is an external view of a wind turbine generator according to an embodiment of the present invention.

FIG. 1 is an external view of a wind turbine generator 10 according to this embodiment.

The wind turbine generator 10 is provided with a tower 12, a nacelle 14 provided at the top of the tower 12, and a wind turbine rotor 16.

The nacelle 14 is provided, in the interior thereof, with a generator 20 and so on (see FIG. 2), and is mechanically linked to the wind turbine rotor 16 and the generator 20 so that the rotation of the wind turbine rotor 16 is transmitted to the generator 20. In addition, the nacelle 14 is capable of swinging in desired yaw directions together with the wind turbine rotor 16.

The wind turbine rotor 16 is provided with a plurality of blades 22 and a hub 24. The plurality of blades 22, whose pitch angles can be individually and variably controlled, are provided on the hub 24 in a radiating pattern.

In this way, with the wind turbine generator 10, the wind turbine rotor 16 rotates by receiving wind power energy on the blades 22, the generator 20 is driven by the rotation of the wind turbine rotor 16, and the power generated by the generator 20 is transmitted to the utility grid.

Figure 2:
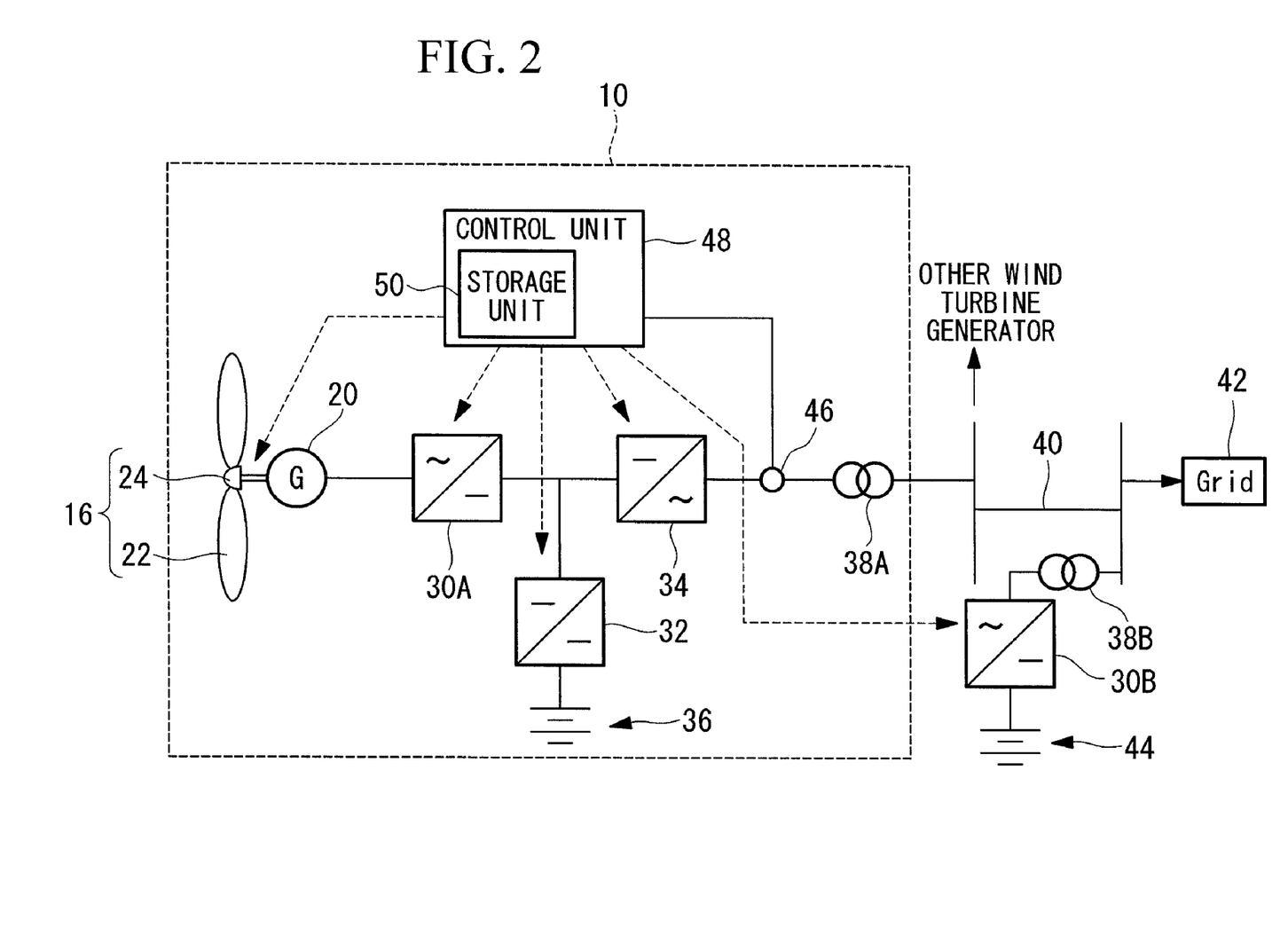
FIG. 2 is a block diagram showing the electrical configuration of the wind turbine generator according to the embodiment of the present invention.

FIG. 2 is a block diagram showing the electrical configuration of the wind turbine generator 10 according to this embodiment.

An AC-DC converter 30A is connected to the generator 20, and alternating-current power output from the generator 20 is converted to direct-current by the AC-DC converter 30A.

In addition, the AC-DC converter 30A is connected to a DC-DC converter 32 and a DC-AC converter 34.

The DC-DC converter 32 is connected to a wind turbine secondary battery device 36, which is a secondary battery (for example, a lithium battery) that is disposed inside the nacelle 14 and can be charged/discharged, and converts voltage converted to direct-current by the AC-DC converter 30A to a voltage level that is suitable for charging the wind turbine secondary battery device 36.

On the other hand, the power converted to the direct-current by the AC-DC converter 30A is converted back to alternating-current again by the DC-AC converter 34. Then, the power converted to alternating-current by the DC-AC converter 34 is transmitted to a utility grid 42 via a transformer 38A, which is for electrically connecting with other wind turbine generators, and a main cable 40.

The main cable 40 for transmitting the power to the utility grid 42 is connected to a farm secondary battery device 44, which is a secondary battery (for example, a lithium battery) disposed outside the nacelle 14 and which can be charged/discharged, via a transformer 38B and an AC-DC converter 30B. The farm secondary battery device 44 may be provided for each wind turbine generator 10 or may be provided for every predetermined number of the wind turbine generators 10.

In addition, the wind turbine generator 10 is provided with a power detector 46 that detects the output power of the generator 20. The power detector 46 detects the power at predetermined time intervals (for example, every 3 seconds).

Furthermore, the wind turbine generator 10 is provided with a control unit 48. The control unit 48 receives, as inputs, detected values that indicate the power detected by the power detector 46 and controls the wind turbine rotor 16, the AC-DC converter 30A, the DC-DC converter 32, the DC-AC converter 34, and the AC-DC converter 30B.

In addition, the control unit 48 is provided with a storage unit 50, which is constituted of a magnetic storage device or a semiconductor storage device. The storage unit 50 is used to store various data and as a work area for programs that are executed by the control unit 48.

Then, the wind turbine generator 10 according to this embodiment derives the gradient of a change in the output power of the generator 20 and performs a processing that determines the increase/decrease in the output power of the generator 20 (hereinafter, referred to as "output-change determining processing") on the basis of the gradient of the change.

Figure 3:
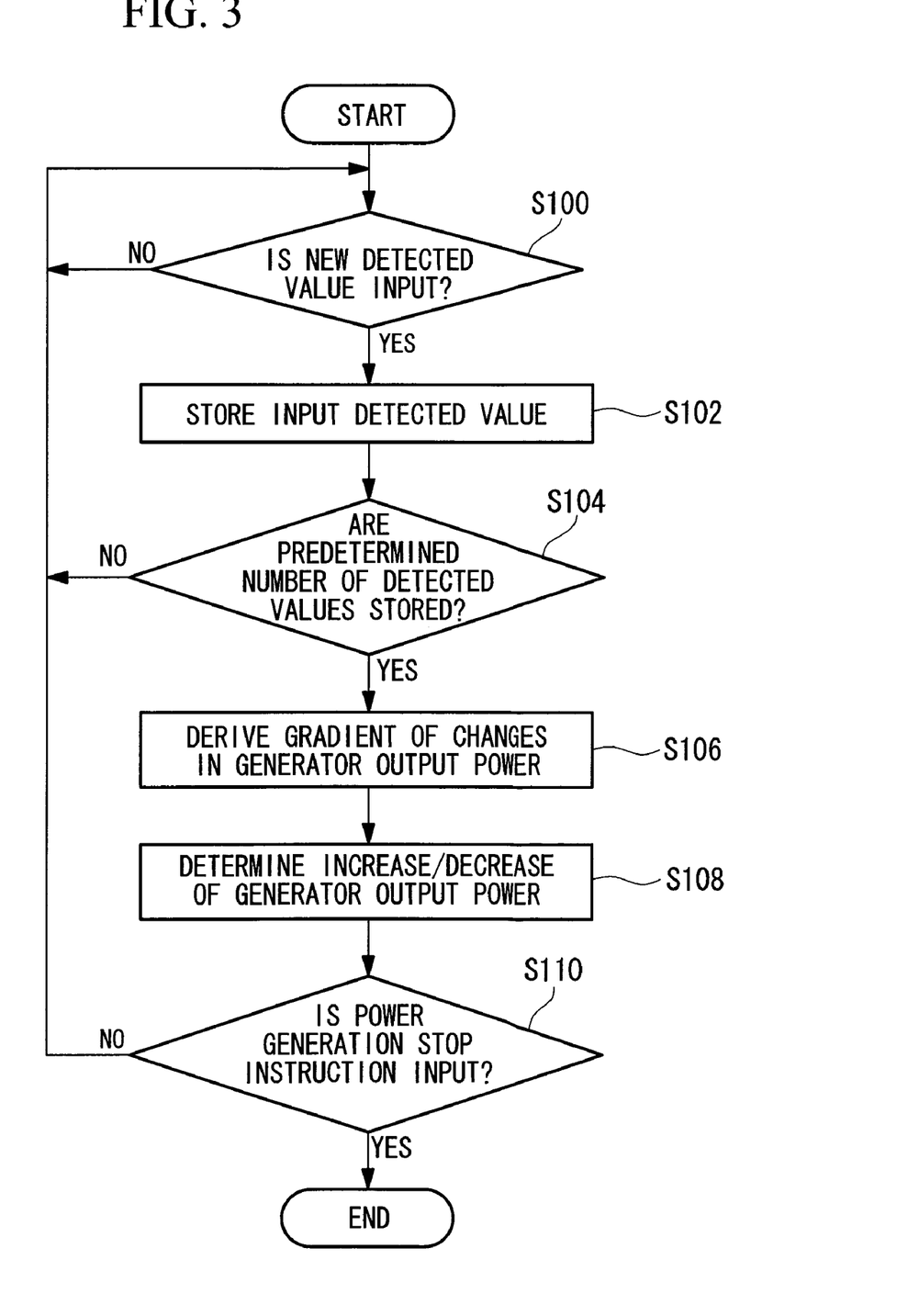
FIG. 3 is a flowchart showing a flow of processing by an output power control program according to the embodiment of the present invention.

FIG. 3 is a flowchart for the case where the output-change determining processing is performed, showing the flow of processing by an output-change determining program that is executed by the control unit 48, the output-change determining program being stored in advance in a predetermined region of the storage unit 50. This program starts up, for example, when the wind turbine generator 10 starts to generate power.

First, at Step 100, a standby state continues until detected values are input from the power detector 46, and upon receiving, as inputs, the detected values from the power detector 46, the process proceeds to Step 102.

At Step 102, the detected values of the output power of the generator 20, which have been input from the power detector 46, are stored in the storage unit 50.

At the subsequent Step 104, it is determined whether or not the detected values stored in the storage unit 50 are stored at least in a predetermined number (two, in this embodiment, as an example) required to determine the increase/decrease of output power from the generator 20. If an affirmative determination is made, the process proceeds to Step 106, and, on the other hand, if a negative determination is made, the process returns to Step 100.

At Step 106, on the basis of the predetermined number of the detected values stored in the storage unit 50, the gradient of the change in output power of the generator 20 is derived.

Figure 4:
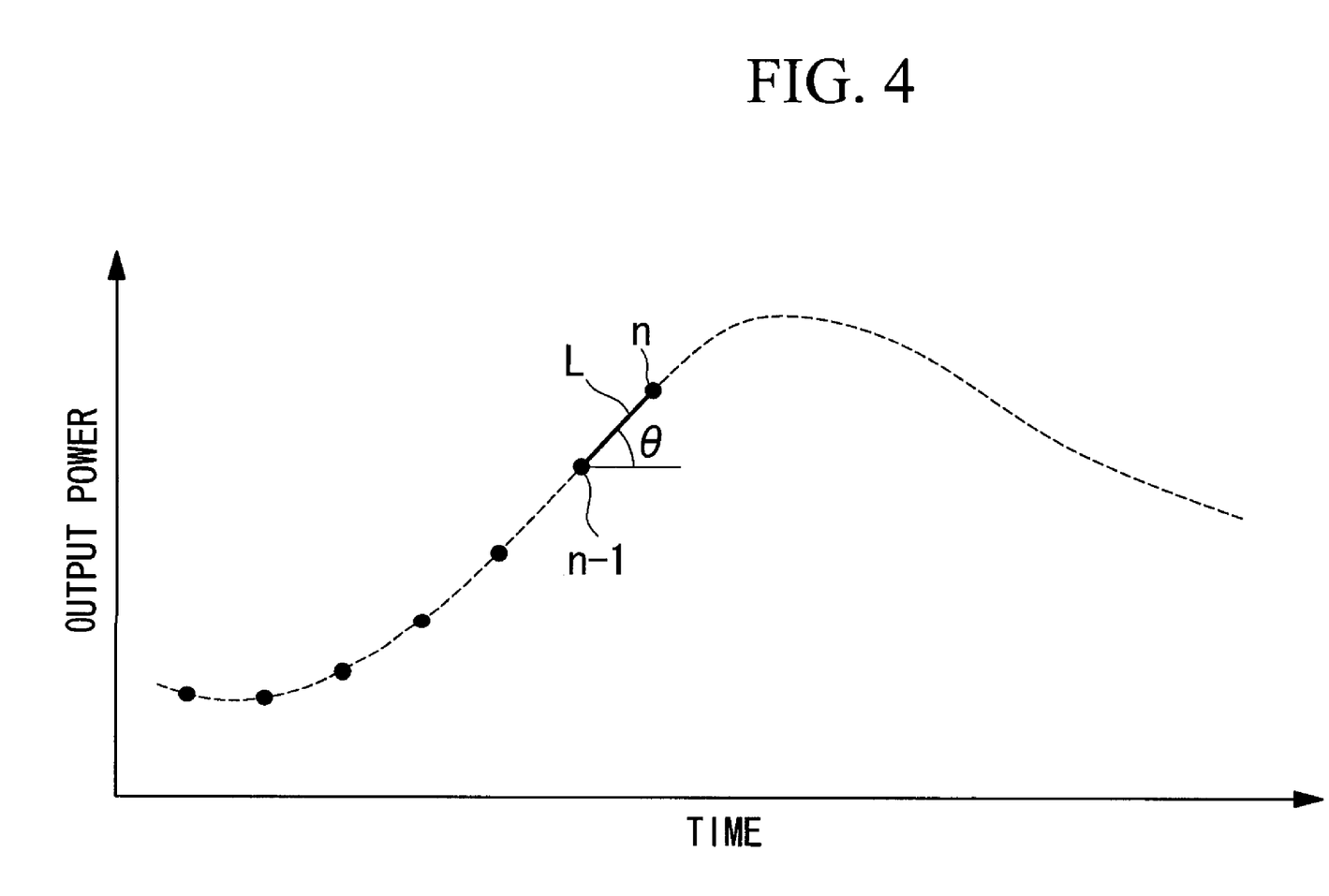
FIG. 4 is a graph that is necessary for explaining the derivation of the gradient of a change in output power of a generator according to the embodiment of the present invention.

A method for deriving the gradient of output power change will be described here, with reference to FIG. 4. FIG. 4 is a graph that shows changes in the power (output power) detected by the power detector 46.

A detected value n shown in FIG. 4 is the latest detected value and a detected value n−1 is the detected value detected immediately before the detected value n.

Then, in this embodiment, the gradient θ of a straight line L connecting the detected value n and the detected value n−1 is derived as the gradient of the output power change.

Note that the number of detected values required to determine the increase/decrease in the output power of the generator 20 may be three or more. In this case, an approximation line of the straight line is obtained from the three or more detected values, and the gradient of the approximation line is taken as the gradient of the change in the output power of the generator 20.

In the subsequent Step 108, the increase/decrease of the output power of the generator 20 is determined on the basis of the gradient θ derived in Step 106.

More specifically, when the gradient θ is, for example, 0°<θ<90°, it is determined that the wind speed is rising, and thus the output power of the generator 20 is increasing. On the other hand, when the gradient θ is, for example, 270°<θ<360°, it is determined that the wind speed is declining, and thus the output power of the generator 20 is decreasing. Note that, when the gradient θ is neither 0°<θ<90° nor 270°<θ<360°, it is determined that there is no increase/decrease in the output power of the generator 20.

That is, the determination results are one of three types: increasing output power, decreasing output power, or no increase/decrease in output power.

In the subsequent Step 110, it is determined whether or not an operator has input an instruction to stop the power generation by the wind turbine generator 10 via a control board (not shown). If an affirmative determination is made, the program is ended, and, if a negative determination is made, the process returns to Step 100.

Next, the case in which the frequency of the utility grid 42 to which the wind turbine generator 10 is connected has dropped due to the occurrence of an abnormality in the utility grid 42 (for example, disconnection of a large power plant) will be described.

Figure 5:
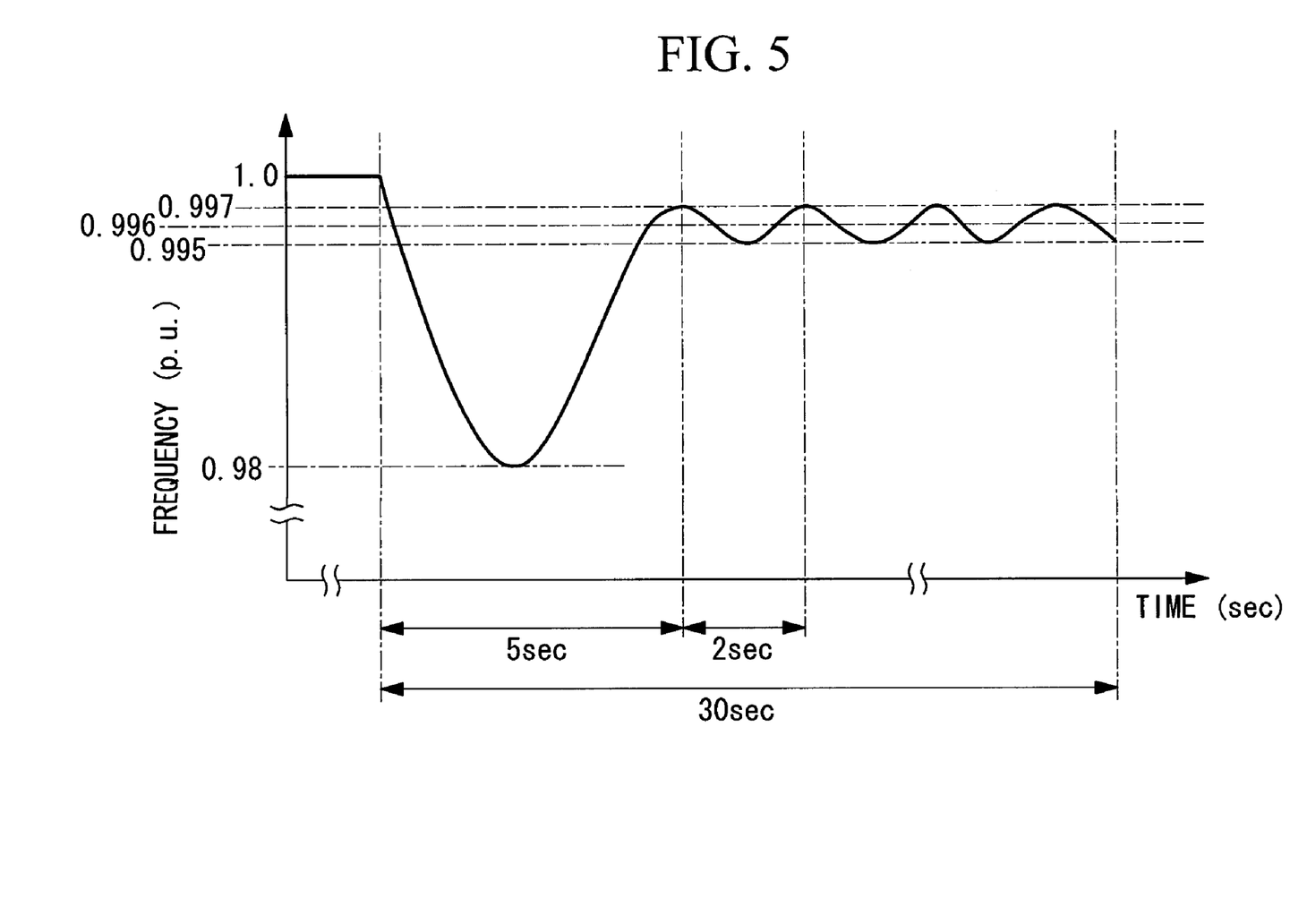
FIG. 5 is a graph showing an example of a frequency drop in the utility grid according to the embodiment of the present invention.

When an abnormality occurs in the utility grid 42, for example, the frequency of the utility grid 42 may temporality drop considerably (frequency drop in a range between 0 to 5 seconds), as shown in FIG. 5. Then, this frequency drop returns to equilibrium state while repeating slight frequency fluctuations (frequency fluctuations with a 2-second periodicity after 5 seconds).

Consequently, in accordance with the frequency fluctuations in the utility grid 42, the wind turbine generator 10 is required to alter its output power in order to compensate for the frequency drop in the utility grid 42, that is the power drop in the utility grid 42. In other words, this requirement corresponds to the power that the utility grid 42 requires from the wind power generator 10 (hereinafter referred to as "required output power").

The required output power is obtained from expression (1) described below. In expression (1), ΔP is a fluctuation range of the required output power corresponding to the frequency fluctuations in the utility grid 42, f is the utility grid frequency, and R is a predetermined constant.

{Eq. 1}

$$\Delta P = \frac{100(1-f)}{R} \quad (1)$$

Figure 6:
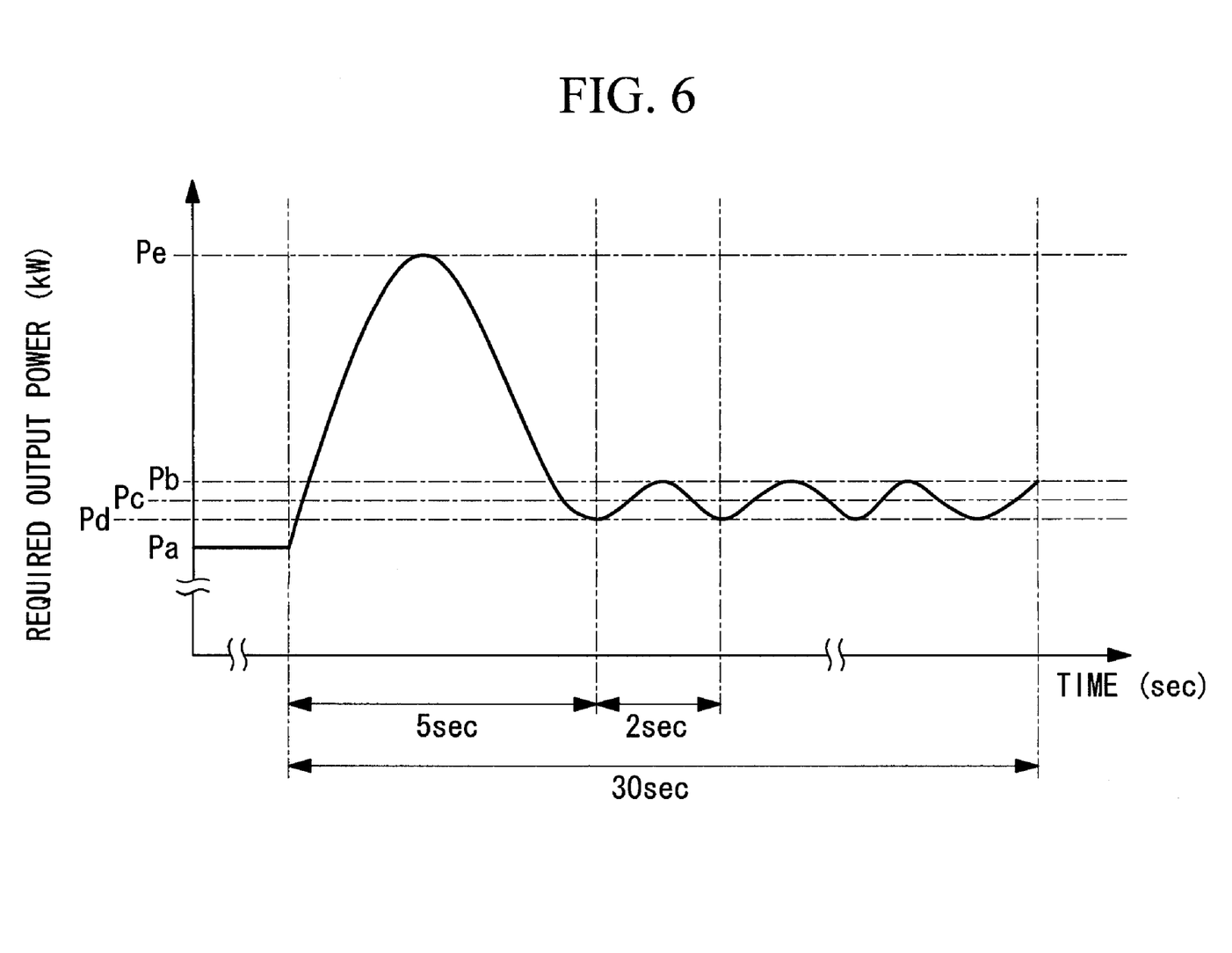
FIG. 6 is a graph showing an example of required output power in response to the frequency drop in the utility grid according to the embodiment of the present invention.

FIG. 6 is a graph showing the required output power corresponding to the frequency drop in the utility grid 42 shown in FIG. 5. As shown in FIG. 6, the required output power increases as the frequency fluctuations in the utility grid 42 increase, and the required output power decreases as the frequency fluctuations in the utility grid 42 decrease.

Then, when the frequency of the utility grid 42 drops, the wind power generator 10 according to this embodiment is controlled by the control unit 48 so as to output the required output power.

Figure 7:
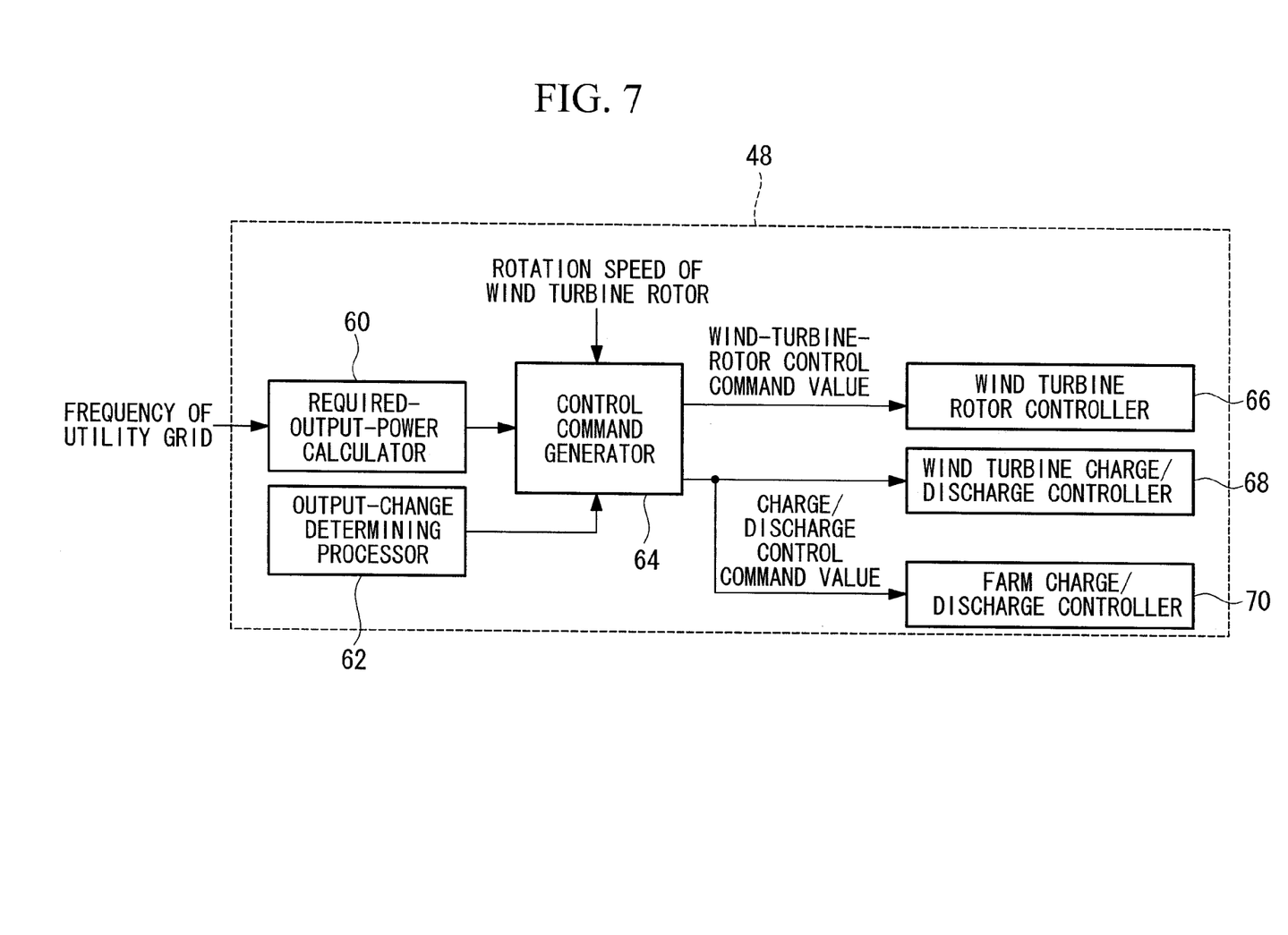
FIG. 7 is a functional block diagram showing functions of a control unit according to the embodiment of the present invention.

FIG. 7 is a block diagram showing functions of the control unit 48 with regard to outputting the required output power. The control unit 48 is a provided with a required-output-power calculator 60, an output-change determining processor 62, and a control command generator 64.

The control unit 48 receives, as an input, the frequency of the utility grid 42.

From the frequency of the utility grid 42 that has been input thereto, the required-output-power calculator 60 calculates a required output power to be increased with respect to the output power of the wind turbine generator 10, using the above-described expression (1), and outputs the calculated value to the control command generator 64 as an output-increase command value.

The output-change determining processor 62 performs the above-described output-change determining processing to determine the increase/decrease in the output power from the generator 20 and outputs the determination results to the control command generator 64.

The control command generator 64 generates a wind-turbine-rotor control command value for controlling the wind turbine rotor 16 and a charge/discharge command value for controlling charging/discharging of at least one of the wind turbine secondary battery device 36 and the farm secondary battery device 44, on the basis of the rotation speed of the wind turbine 16, the output-increase command value output from the required-output-power calculator 60, and the determination results obtained by the output-change determining processor 62.

The wind-turbine-rotor control command value is transmitted to a wind turbine rotor controller 66, and the charge/discharge control command value is transmitted to a wind-turbine charge/discharge controller 68 and a farm charge/discharge controller 70.

On the basis of the wind-turbine rotor control command value, the wind-turbine rotor controller 66 applies a damping force (break) to the wind turbine rotor 16 or changes the pitch angles of the blades 22.

On the basis of the charge/discharge control command value, the wind-turbine charge/discharge controller 68 controls the DC-DC converter 32 so that the wind turbine secondary battery device 36 is charged/discharged.

On the basis of the charge/discharge control command value, the farm charge/discharge controller 70 controls the AC-DC converter 30B so that the farm secondary battery device 44 is charged/discharged.

Next, the case in which the frequency of the utility grid 42 has dropped and the output-change determining processor 62 has determined that the output power of the generator 20 is reduced will be described.

When an abnormality occurs in the utility grid 42, the frequency of the utility grid 42 drops considerably immediately after the occurrence of the abnormality, as shown in the above-described FIG. 5. As shown in FIG. 6, the required output power in response to this large frequency drop is large relative to that in the subsequent period.

Accordingly, in response to the large frequency drop in the utility grid 42, a damping force is applied to the wind turbine rotor 16 thereby compensating the output power with the inertial force (inertial energy) accumulated in the wind turbine rotor 16.

Figure 8:
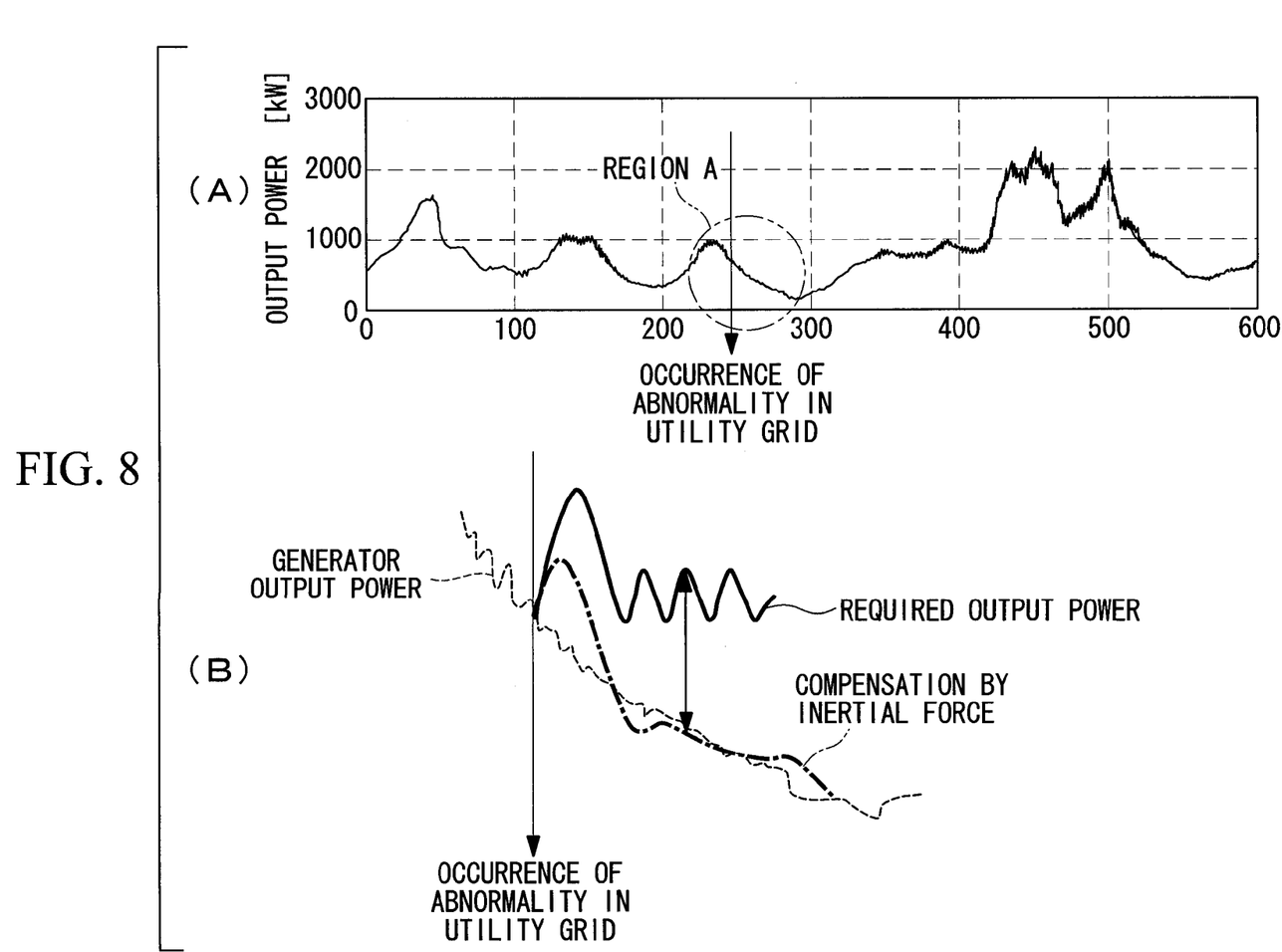
FIG. 8 is an example of the wind turbine generator output power for the case in which compensation is performed using inertial force accumulated in a wind turbine rotor when the utility grid frequency has dropped and the generator output power is also reduced, wherein (A) is an overall view showing the timing at which an abnormality has occurred in the utility grid, and (B) is an enlarged view of a region A, which shows regions before and after the timing at which the abnormality has occurred in the utility grid.

FIG. 8 shows the change in output power of the wind turbine generator 10 and an example of timing at which an abnormality occurs in the utility grid 42 when the output power of the generator 20 is reduced, wherein FIG. 8(B) is an enlarged view of the region A in FIG. 8(A).

Then, as shown in FIG. 8(B), due to the compensation with the inertial force accumulated in the wind turbine rotor 16, the output power of the wind turbine generator 10 temporarily approaches the required output power. However, the output power of the generator 20 subsequently decreases because a damping force is applied to the wind turbine rotor 16. Accordingly, the wind turbine generator 10 is unable to output the required output power.

Therefore, when the frequency of the utility grid 42 has dropped and the output power of the generator 20 is also reduced, the wind turbine generator 10 according to this embodiment uses the power charged in the wind turbine secondary battery device 36 to compensate for the amount by which the inertial force falls short in the compensation. That is, control command generator 64 generates a wind-turbine-rotor control command value and a charge/discharge control command value in order for the wind turbine generator 10 to output the required output power.

Figure 9:
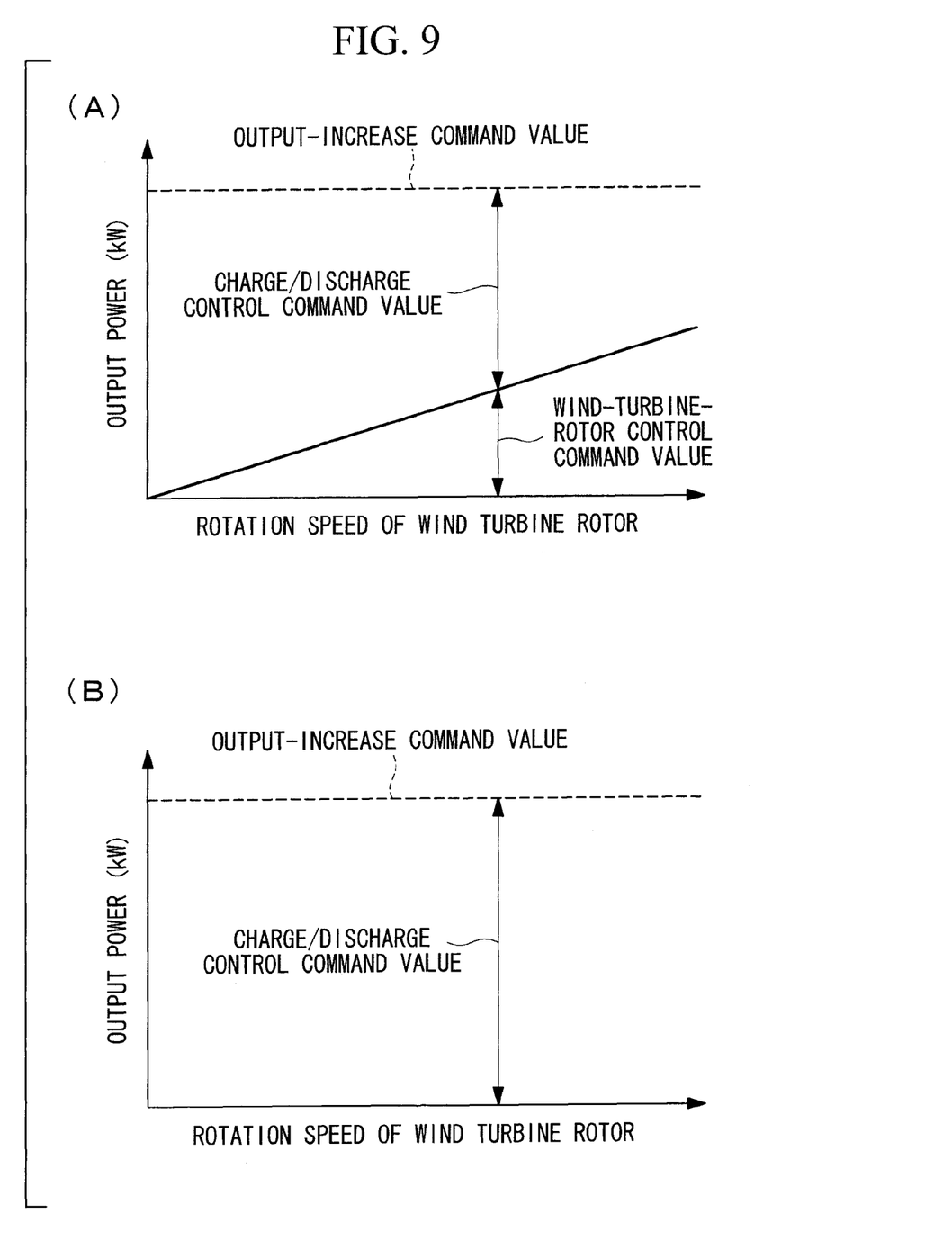
FIG. 9 is a pattern diagram showing a ratio between the output power of a wind turbine secondary battery and the inertial force accumulated in the wind turbine rotor required for the wind turbine generator according the embodiment of the present invention to output the power that satisfies the required output power, wherein (A) is a case in which the required output power is at or above a threshold set in advance, and (B) is a case in which the required output power is below the threshold set in advance.

FIG. 9 shows the ratio between the output power from the wind turbine secondary battery device 36 and the inertial force accumulated in the wind turbine rotor 16 required for the wind turbine generator 10 to output power that satisfies the required output power.

FIG. 9(A) shows the ratio between the wind turbine secondary battery device 36 and the inertial force accumulated in the wind turbine rotor 16 for the case in which the output-increase command value that indicates the required output power is at or above a proportion (for example, 3%) determined in advance relative to the output power of the wind turbine generator 10. In the following description, the above-described proportion will be referred to simply as a threshold.

When the output-increase command value is at or above the threshold determined in advance, the control command generator 64 generates the wind-turbine-rotor control command value and the charge/discharge control command value so that, as shown in FIG. 9(A), as the rotation speed of the wind turbine rotor 16 increases, the output power produced by the inertial force accumulated in the wind turbine rotor 16 increases and the output power of the wind turbine secondary battery device 36 decreases.

On the other hand, when the output-increase command value that indicates the required output power is less than the threshold determined in advance, as shown in FIG. 9(B), the control command generator 64 does not generate the wind-turbine-rotor control command value but generates the charge/discharge control command value so that the required output power is satisfied by discharging the wind turbine secondary battery device 36 regardless of the rotation speed of the wind turbine rotor 16. This is because, when the output-increase command value is less than the threshold, the output power to be followed is too small and the output power cannot be followed by controlling the wind turbine rotor 16.

Figure 10:
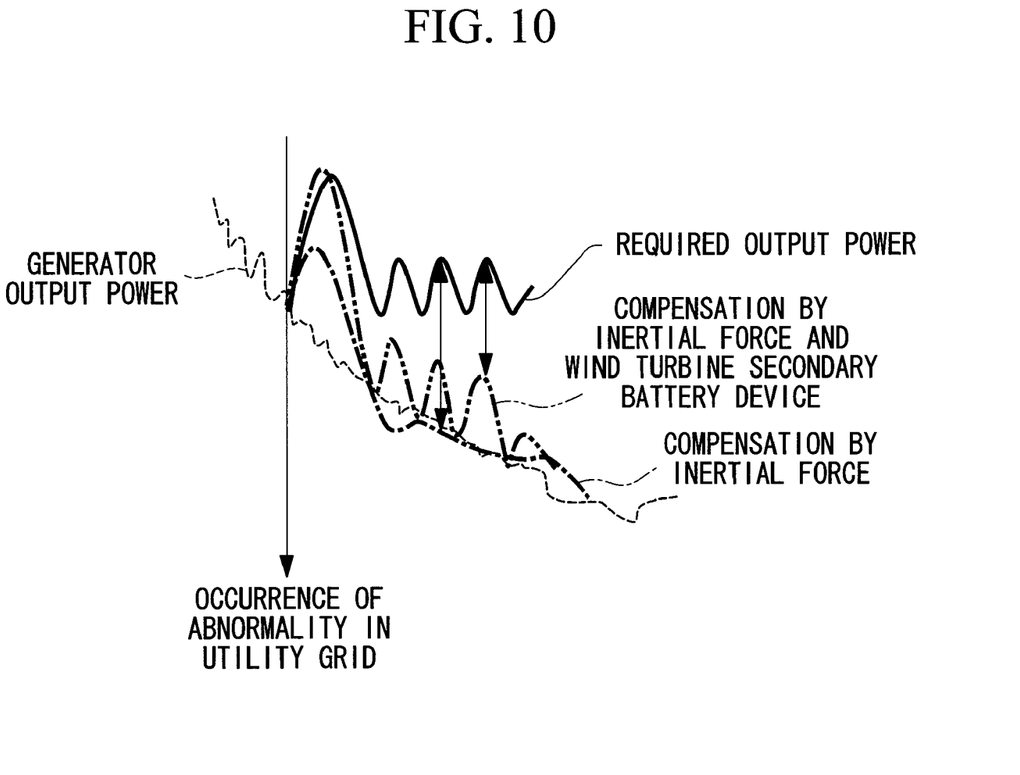
FIG. 10 shows, for the wind turbine generator according to the embodiment of the present invention, an example of the output power from the wind turbine generator in the case in which compensation is performed using the inertial force accumulated in the wind turbine rotor and a wind turbine secondary battery device, when the utility grid frequency has dropped and the generator output power is also reduced.

FIG. 10 shows an example of the case in which compensation is performed using the inertial force accumulated in the wind turbine rotor 16 and the wind turbine secondary battery device 36. As shown in FIG. 10, when the compensation is performed using the inertial force accumulated in the wind turbine rotor 16 and the wind turbine secondary battery device 36, as compared with the case in which only the inertial force accumulated in the wind turbine rotor 16 is used, the difference between the output power of the wind turbine generator 10 and the required output power becomes smaller.

In the example shown in FIG. 10, the required output power is not satisfied by the discharge of the wind turbine secondary battery device 36 alone. In such a case, a charge/discharge control command value is generated, whereby compensation is performed also using the farm secondary battery device 44 by causing the farm secondary battery device 44 to also discharge.

As described above, when the frequency of the utility grid 42 has dropped and the output power of the generator 20 is also reduced, the wind turbine generator 10 according to this embodiment compensates for the difference between the output power of the generator 20 and the required output power with the inertial force accumulated in the wind turbine rotor 16 and the power charged in the wind turbine secondary battery device 36 or the farm secondary battery device 44.

The difference between the output power of the generator 20 and the required output power may be compensated for only with the inertial force accumulated in the wind turbine rotor 16, or it may be compensated for only with the power charged in the wind turbine secondary battery device 36 or the farm secondary battery device 44.

In addition, even while power in accordance with the required output power is being output, the wind turbine generator 10 determines the increase/decrease in output power of the generator 20 with the output-change determining processor 62, newly generates the wind-turbine-rotor control command value and the charge/discharge control command value with the control command generator 64 in accordance with the determination results, and outputs them.

Next, the case in which the frequency of the utility grid 42 has dropped and the output-change determining processor 62 has determined that the output power of the generator 20 is increased will be described.

Figure 11:
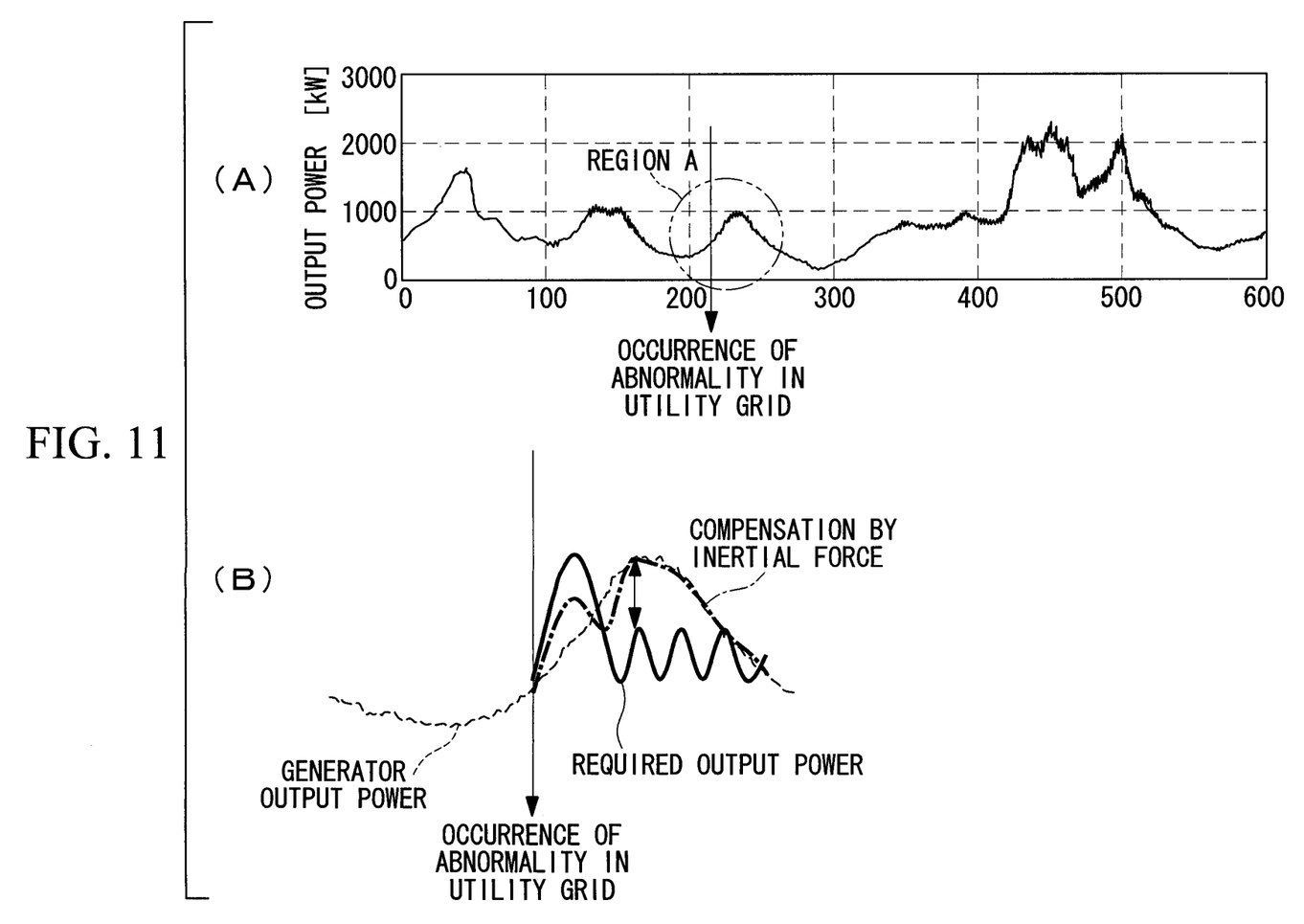
FIG. 11 shows an example output power from the wind turbine generator in the case in which compensation is performed using the inertial force accumulated in the wind turbine rotor, when the utility grid frequency has dropped and the generator output power is increased, wherein (A) is an overall diagram showing timing of the occurrence of an abnormality in the utility grid, and (B) is an enlarged view of a region A which shows regions before and after the timing at which the abnormality has occurred in the utility grid.

FIG. 11 shows the change in output power of the wind turbine generator 10 and an example of timing at which an abnormality occurs in the utility grid 42 when the output power of the generator 20 is increased, wherein FIG. 11(B) is an enlarged view of the region A in FIG. 11(A).

FIG. 11(B) shows an example case in which, in response to the frequency drop in the utility grid 42, compensation is performed using the inertial force accumulated in the wind turbine rotor 16.

As shown in FIG. 11(B), when compensation is performed using the inertial force accumulated in the wind turbine rotor 16, the output power of the wind turbine generator 10 temporarily becomes equivalent to the required output power. However, because the output power of the generator 20 is increased, the output power of the wind turbine generator 10 may subsequently exceed the required output power.

Therefore, when the frequency of the utility grid 42 has dropped and the output power of the generator 20 is increased, the wind turbine generator 10 according to this embodiment reduces the output power of the generator 20. More specifically, the control unit 48 stores in the storage unit 50 the output level of the generator for the case in which the frequency of the utility grid 42 has dropped, that is, when an abnormality has occurred in the utility grid 42 (hereinafter, referred to as "stored output level"). Then, the control unit 48 controls the output power of the generator 20 so as to match the stored output level and also performs control so that the difference between the output power of the generator 20 and the required output power is compensated for with the inertial force accumulated in the wind turbine rotor 16 and the power charged in the wind turbine secondary battery device 36.

That is, the control command generator 64 generates, first, the wind-turbine-rotor control command value, which corresponds to the frequency that has considerably dropped immediately after the occurrence of an abnormality in the utility grid 42, for applying the damping force to the wind turbine rotor 16, and then the charge/discharge control command value for causing the wind turbine secondary battery device 36 to discharge. Accordingly, by compensation with the inertial force accumulated in the wind turbine rotor 16 and the power discharged from the wind turbine secondary battery device 36, the wind turbine generator 10 outputs power that satisfies the required output power.

Subsequently, the control command generator 64 generates the wind-turbine-rotor control command value for controlling the pitch angles of the blades 22 so that the output power of the generator 20 decreases to the stored output level. More specifically, by generating the wind-turbine-rotor control command value that changes the pitch angles of the blades 22 to the feather side, the wind power that the blades 22 receive is decreased, thereby reducing the output power of the generator 20.

Figure 12:
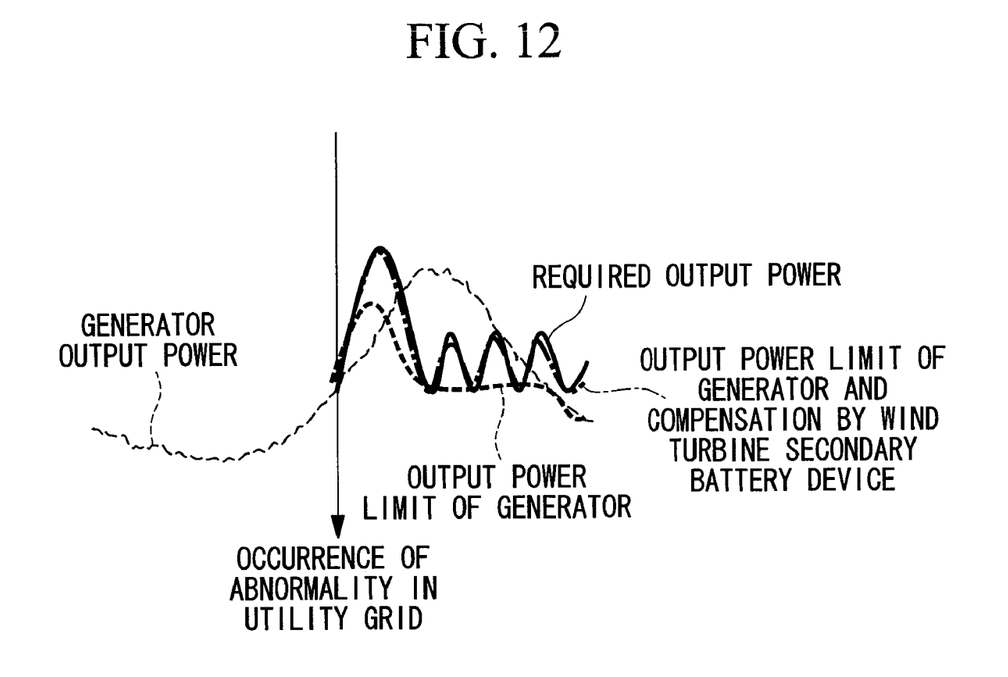
FIG. 12 shows, for the wind turbine generator according to the embodiment of the present invention, an example output power from the wind turbine generator in the case in which compensation is performed using inertial force accumulated in the wind turbine rotor and a wind turbine secondary battery device, when the utility grid frequency has dropped and the generator output power is increased.

The one-dot chain line in FIG. 12 shows the case in which the output power of the generator 20 is reduced to the stored output level. Accordingly, it is possible to prevent the output power of the wind turbine generator 10 from exceeding the required effective output power. However, because this alone is not sufficient to cope with minute frequency fluctuations in the utility grid 42, the output power of the wind turbine generator 10 does not achieve the required effective output power.

Consequently, the control command generator 64 according to this embodiment generates the wind-turbine-rotor control command value for controlling the pitch angles of the blades 22 and, on the basis of the output-increase command value, generates the charge/discharge control command value for causing the wind turbine secondary battery device 36 to discharge power. Accordingly, as the broken line in FIG. 12 indicates, the wind turbine generator 10 can match its output power with the required output power.

As described above, when the frequency of the utility grid 42 has dropped and the output power of the generator 20 is increased, the wind turbine generator 10 according to this embodiment controls the output power of the generator 20 so as to match the stored output level stored in the storage unit 50 and compensates for the difference between the output power of the generator 20 and the required output power with the inertial force accumulated in the wind turbine rotor 16 and the power charged in the wind turbine secondary battery device 36.

Consequently, even when the utility grid frequency has dropped due to an abnormality occurring in the utility grid 42 and the wind speed is also rising, the wind turbine generator 10 can output the power required for the utility grid 42.

When the required output power cannot be satisfied by discharging power only from the wind turbine secondary battery device 36, the control command generator 64 according to this embodiment generates the charge/discharge control command value for performing compensation using also the farm secondary battery device 44, causing also the farm secondary battery device 44 to discharge. Compensation may be performed by having only the farm secondary battery device 44 discharge, without having the wind turbine secondary battery device 36 discharge.

Although the present invention has been described above using the above-described embodiment, the technical scope of the present invention is not limited to the scope described in the above-described embodiment. Various changes or improvements may be added to the above-described embodiment within a range that does not depart from the gist of the invention, and the technical scope of the present invention encompasses configurations with such changes or improvements.

For example, in order to match the output power of the generator 20 with the stored output level, the case of controlling the pitch angles of the blades 22 has been described in the above-described embodiment; however, the present invention is not limited thereto, and, in order to match the output power of the generator 20 with the stored output level, a configuration in which control is performed so that the power generated by the generator 20 charges a secondary battery is permissible.

More specifically, for example, the wind turbine secondary battery device 36 is provided with a plurality of secondary batteries, and, the power generated by the generator 20 charges only those secondary batteries among the plurality of secondary batteries that do not contribute to discharging. Note that, the secondary batteries that contribute to discharging are the secondary batteries that are discharging to match the output power of the wind turbine generator 10 with the required output power.

In addition, although the case in which a lithium battery is used as the wind turbine secondary battery device 36 has been described in the above-described embodiment, the present invention is not limited to this, and a configuration in which other power storage unit, such as an electric field capacitor, etc. is used as the wind turbine secondary battery device 36 is permissible.

Furthermore, although the case in which the wind turbine secondary battery device 36 is disposed inside the nacelle 14 has been described in the above-described embodiment, the present invention is not limited to this, and a configuration in which the wind turbine secondary battery device 36 is disposed inside the tower 12 or below the tower 12 is permissible.

Additionally, also permissible is a configuration in which the wind turbine generator 10 provided with the wind turbine secondary battery device 36 supplies power charged in the wind turbine secondary battery device 36 to other wind turbine generators without the wind turbine secondary battery device 36, thereby making the output power of the wind turbine generators satisfy the required output power.

In this configuration, the wind turbine generator 10 receives measured values of output power that are output from the other wind turbine generators, and discharges, from the wind turbine secondary battery device 36, power corresponding to the differences between the required output power being required for the other wind turbine generators and the received measured values.

REFERENCE SIGNS LIST

10: wind turbine generator
16: wind turbine rotor

20: generator
22: blade
36: wind turbine secondary battery device
42: utility grid
44: farm secondary battery device
48: control unit
50: storage unit

The invention claimed is:

1. A wind turbine generator, comprising:
a wind turbine rotor having a plurality of blades and rotatable upon receiving wind thereon,
a generator configured to be driven by rotation of the wind turbine rotor, for generating and supplying power to a utility grid,
a determination unit for deriving a gradient of a change in output power of the generator and for determining whether the output power of the generator is reduced or increased on the basis of the derived gradient;
a control unit for performing power control in response to a drop in a frequency of the utility grid, on the basis of a determination result of the determination unit; and
a chargeable secondary battery,
wherein the control unit is configured to, in response to the drop in the frequency of the utility grid and a determination by the determination unit that the output power of the generator is reduced, perform control so as to compensate for the difference between the output power of the generator and the power required by the utility grid with at least one of an inertial force accumulated in the wind turbine rotor and power charged in the secondary battery.

2. A wind turbine generator according to claim 1, further comprising:
a storing unit for storing, in response to the drop in the frequency of the utility grid and a determination by the determination unit that the output power of the generator is increased, output level of the generator,
wherein the control unit is configured to perform control so that the output power of the generator matches the output level stored in the storing unit, and so that the difference between the output power of the generator and the power required by the utility grid is compensated for with the inertial force accumulated in the wind turbine rotor and the power charged in the secondary battery.

3. A wind turbine generator according to claim 2, wherein the control unit is configured to control pitch angles of the blades so that the output power of the generator matches the output level stored in the storing unit.

4. A wind turbine generator according to claim 2, comprising:
a plurality of the secondary batteries,
wherein the control unit is configured to perform control so that the power generated by the generator is stored only in those secondary batteries among the plurality of the secondary batteries that do not contribute to discharging, so as to match the output power of the generator with the output level stored in the storing unit.

5. An output power control method for a wind turbine generator, which includes a wind turbine rotor having a plurality of blades for rotation upon receiving wind thereon, and a generator driven by rotation of the wind turbine rotor for generating and supplying power to a utility grid, the output power control method comprising:
a first step of deriving a gradient of a change in output power of the generator and determining whether the output power of the generator is reduced or increased on the basis of the derived gradient;
a second step of performing power control on the basis of a determination result of the first step, in response to a drop in a frequency of the utility grid, and
a third step of performing control so as to compensate for the difference between the output power of the generator and the power required by the utility grid with at least one of an inertial force accumulated in the wind turbine rotor and power charged in a secondary battery, in response to the drop in the frequency of the utility grid and a determination at the first step that the output power of the generator is reduced.

* * * * *